(12) United States Patent  
Matsuda (10) Patent No.: US 7,698,496 B2  
(45) Date of Patent: Apr. 13, 2010

(54) CACHE MEMORY OBSERVATION DEVICE AND METHOD OF ANALYZING PROCESSOR

(75) Inventor: Genichiro Matsuda, Osaka (JP)

(73) Assignee: Panasonic Corporation, Osaka (JP)

(*) Notice: Subject to any disclaimer, the term of this patent is extended or adjusted under 35 U.S.C. 154(b) by 565 days.

(21) Appl. No.: 11/700,065

(22) Filed: Jan. 31, 2007

(65) Prior Publication Data

US 2007/0180192 A1 Aug. 2, 2007

(30) Foreign Application Priority Data

Jan. 31, 2006 (JP) ............................. 2006-022470

(51) Int. Cl.  
*G06F 12/00* (2006.01)

(52) U.S. Cl. ..................... 711/3; 711/118; 711/129; 711/E12.046

(58) Field of Classification Search .................. None  
See application file for complete search history.

(56) References Cited

U.S. PATENT DOCUMENTS

2003/0070045 A1* 4/2003 Dwyer et al. ............... 711/128  
2005/0155020 A1 7/2005 DeWitt, Jr. et al.

FOREIGN PATENT DOCUMENTS

JP 09-198275 7/1997

* cited by examiner

*Primary Examiner*—Reginald G Bragdon  
*Assistant Examiner*—Shawn X Gu  
(74) *Attorney, Agent, or Firm*—McDermott Will & Emery LLP (57) ABSTRACT

A cache miss judger judges a cache miss when a cache access is executed. An entry region judger judges which of a plurality of entry regions constituted with one or a plurality of cache entries in the cache memory is accessed by each of the cache accesses using at least a part of an index for selecting an arbitrary cache line in the cache memory. A cache miss counter counts number of the cache misses judged by the cache miss judger in each of the entry regions that is made to correspond to each of the cache accesses.

3 Claims, 11 Drawing Sheets

CACHE MEMORY OBSERVATION DEVICE AND METHOD OF ANALYZING PROCESSOR

BACKGROUND OF THE INVENTION

1. Field of the Invention

The present invention relates to a cache memory observation device for a processor and a method of analyzing the processor.

2. Description of the Related Art

In a conventional method of analyzing a processor, an address, data and the like at the time of the data access are directly outputted without any change by means of a hardware tracing function, and then actions for improving the performance are examined based on the data. Further, as recited in No. H09-198275 of the Japanese Patent Applications Laid-Open, for example, there is conventionally available a computer system for performance improvement comprising a penalty analyzing tool for obtaining a penalty distribution in execution when the tracing data obtained by means of the hardware tracing function is analyzed and an improvement item recommending tool which proposes actions to be taken for the improvement based on a result of the analysis.

Figure 10:
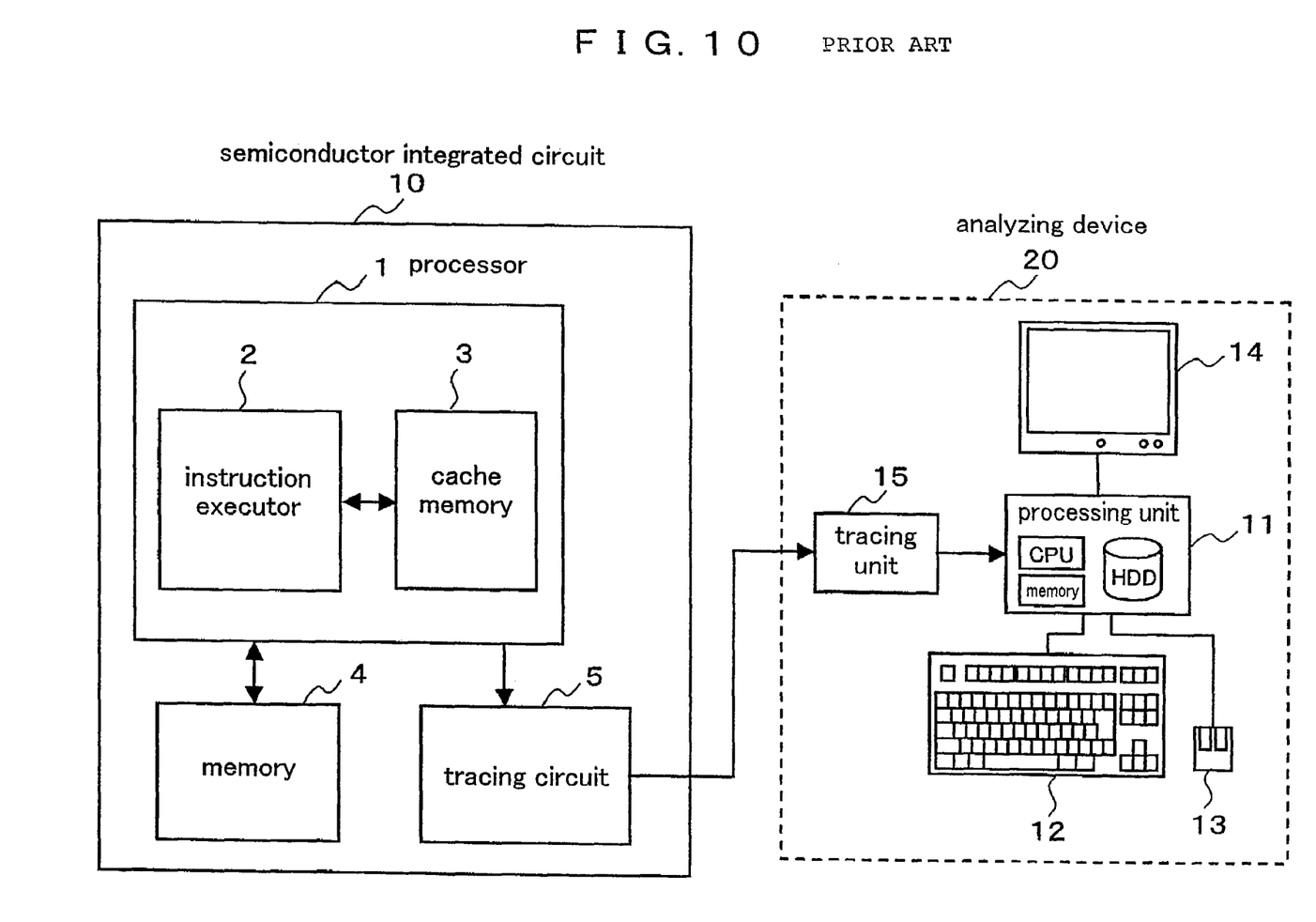
FIG. 10 is a block diagram showing constitutions of a semiconductor integrated circuit and an analyzing device according to a conventional technology.

FIG. 10 is a block diagram showing a constitution of a semiconductor integrated circuit and an analyzing device according to a conventional technology. A semiconductor integrated circuit 10 comprises a processor 1, a memory 4, a tracing circuit 5 and the like. The processor 1 comprises an instruction executor 2 and a cache memory 3. An analyzing device 20 for analyzing the semiconductor integrated circuit 10 comprises a processing unit 11 comprising a microcomputer provided with a CPU, a memory (ROM and RAM) and the like, a keyboard 12 which is provided with character keys, numeric keys, function instructing keys and the like and accepts various key inputs and inputs such as instructions for debugging and performance analysis, a mouse 13 for accepting inputs of position data indicated by a mouse cursor, a display device 14 such as CRT, LCD or the like for displaying tracing results, analyzing results and various messages and the like, and a tracing unit 15.

The processing unit 11 plays a role of controlling the system and, in addition, executes computations for the debug outputted from the semiconductor integrated circuit 10, processes the tracing information, and make the tracing result memorize in HDD which is a memory device. An execution information relating to instructions executed by the processor 1, memory access information and cache miss information are outputted to the analyzing device 20 via the tracing circuit 5. The tracing information inputted to the analyzing device 20 is used for the debug, performance analysis and the like in the processor 1.

Figure 11:
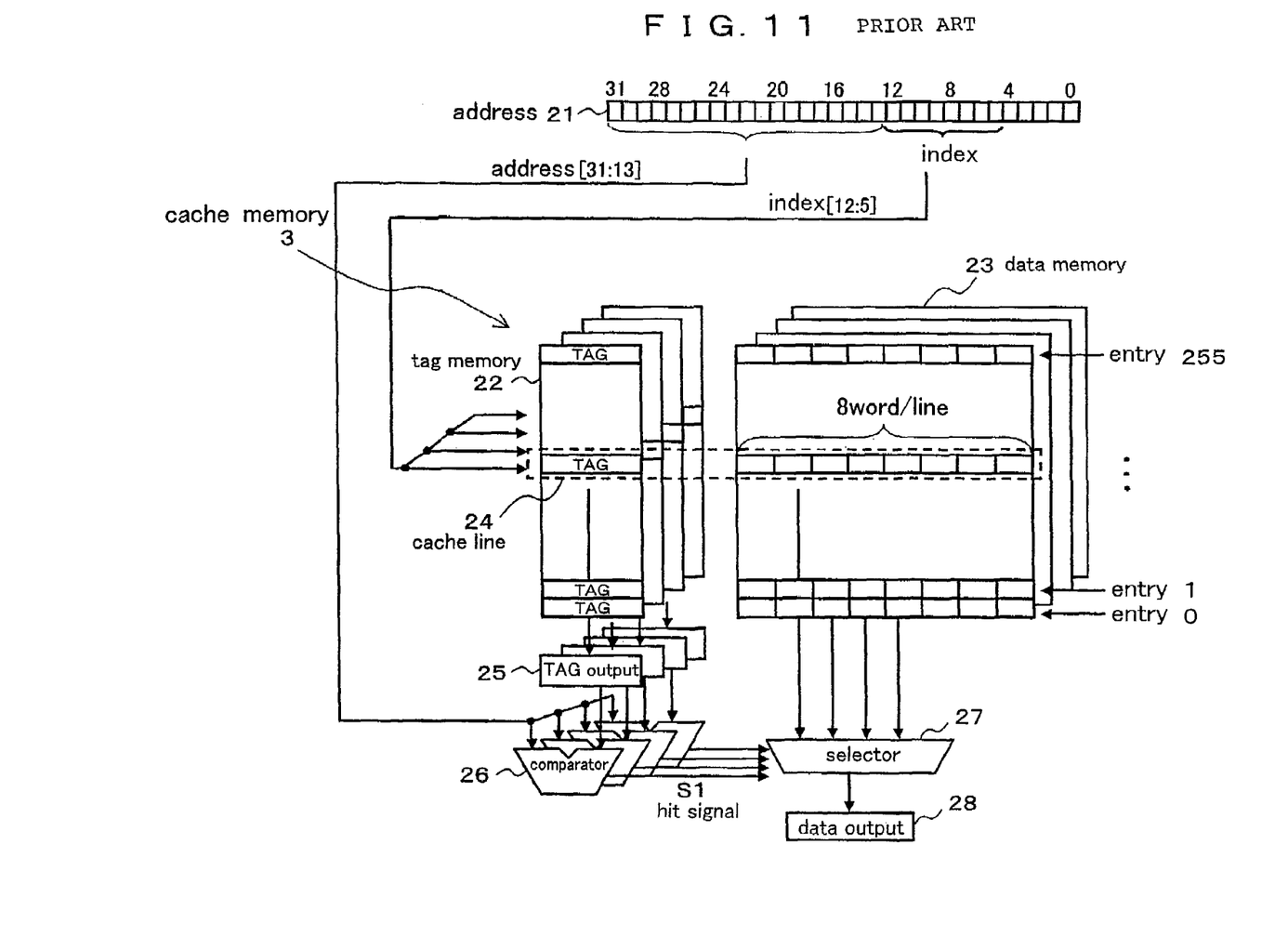
FIG. 11 is a block diagram showing a constitution of a cache memory observation device according to the conventional technology.

FIG. 11 is a block diagram showing a conventional constitution of the cache memory 3. The cache memory 3 is constituted according to the 4-way set associative method. The cache memory 3 comprises a pair of memories which are a tag memory 22 and a data memory 23. The pair of memories is called a cache line 24. In the example recited here, eight words constitute the cache line 24, and [4:2] of an address 21 is used for the selection of the cache line 24. [1:0] of the address 21 is used for the selection of bytes. The particular cache line 24 is selected for each address. A part of the address for the selection of the cache line is called an index, and a bit width of the index is determined by number of cache entries. In the present example, as the number of the cache entries is $2^8=256$, the index is [12:5] of the address 21.

When a memory access is made to an address from the processor 1, the particular cache line is determined by the index, and data is read from the tag memory 22 and the data memory 23 corresponding to the determined cache line. Then, the data contents read from the tag memory 22 (hereinafter, referred to tag section) are compared to [31:13] which is high-order bits of the address 21 in the comparator 26, and the data in the relevant cache line is judged to be valid in the case where the compared data are coincident with each other in any of the four ways, which is called a cache hit. A valid data 28 is selected from the data memory 23 by a selector 27 and outputted to be delivered to the processor 1. Adversely, in the case where the contents of the tag section are different in all of the four ways, the data in the relevant cache line is judged to be invalid, which is called a cache miss.

In order to improve the performance of the processor 1, the address and the cache miss information of each memory access are effective because it can be detected where the cache miss was generated in the program if the address and the cache miss information of the memory access are known. When the program in the relevant section is then optimized so that the performance of the processor can be improved. There are various methods of optimizing the program. Generally, optimization of algorithm and optimization of a memory map are known.

In recent years, speeding up of the processor has been advanced, which generates a larger difference of a transfer rate to the outside of the chip. Accordingly, even if the tracing information is tried to output at a clock cycle of the processor, the transfer rate at a tracing terminal is not fast enough for the output, which results in the failure to accurately output the data. Therefore, as an conventional action for dealing with the problem, the information to be outputted was stored in a memory (tracing memory) or a buffer inside the chip and outputted after the program was executed. However, the cache access is extremely often generated, and a capacity necessary for the tracing memory and the like is significantly large in the case where the information relating to all of the cache accesses is tried to output as the tracing information.

SUMMARY OF THE INVENTION

Therefore, a main object of the present invention is to provide a cache memory observation device having such a function that obtains valid data for optimization of a program through an additional circuit configuration in a relatively small scale.

Figure 1:
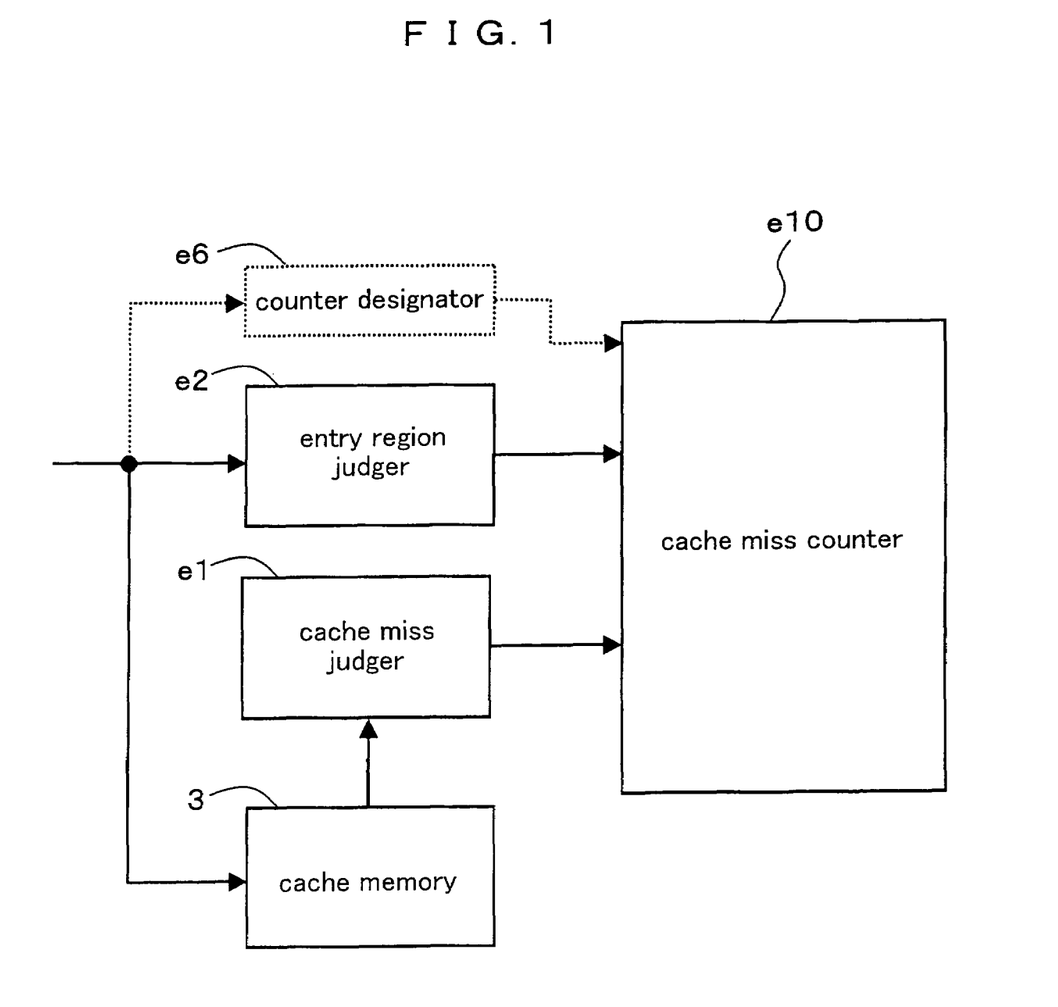
FIG. 1 is a (first) block diagram showing a constitution of a cache memory observation device according to the present invention.

In order to achieve the foregoing object, a cache memory observation device for observing a cache access executed with respect to a cache memory comprising a plurality of cache entries according to the present invention comprises, as shown in FIG. 1:

- a cache miss judger e1 for judging a cache miss when the cache access is executed;
- an entry region judger e2 for judging which of a plurality of entry regions, that is constituted in the cache memory by one or a plurality of cache entries, corresponds to each of the cache accesses using at least a part of an index for selecting an arbitrary cache line in the cache memory; and
- a cache miss counter e10 for counting number of the cache misses judged by the cache miss judger e1 with respect to each of the entry regions which is made to correspond to each of the cache accesses by the entry region judger e2.

According to the foregoing constitution, even when the processor is operated so fast that a tracing rate cannot catch up with, it can be measured how much the number of the cache misses is generated in which of the entry regions. Furthermore, it is achieved with an addition of relatively small circuit by use of an index distribution, and optimization of the program in order to improve the performance can be advantageously developed.

Figure 2:
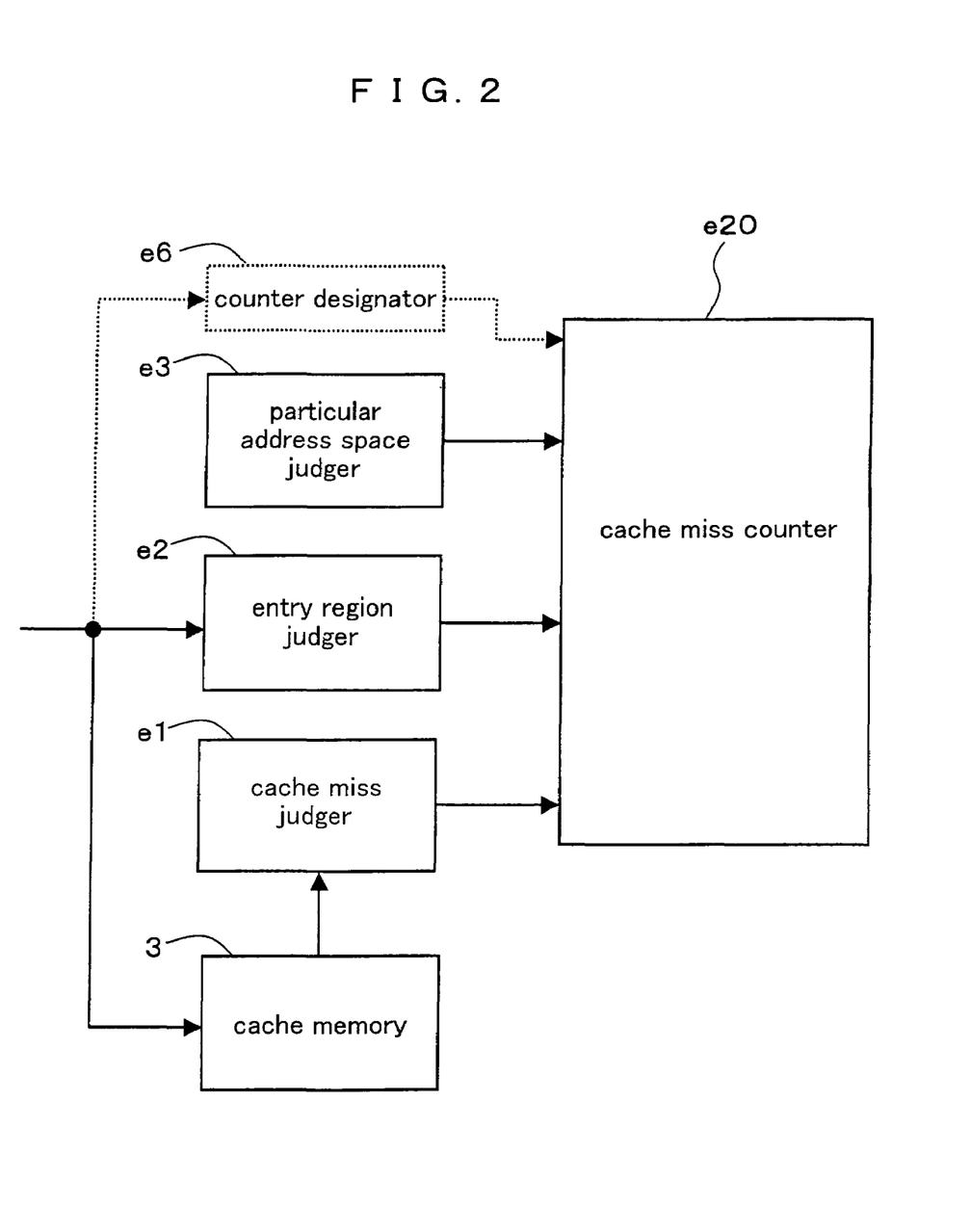
FIG. 2 is a (second) block diagram showing the constitution of the cache memory observation device according to the present invention.

The cache memory observation device according to the present invention, as shown in FIG. 2, further comprises a particular address space judger e3 for judging whether or not the cache access is an access with respect to a particular address space previously set by comparing an address of the cache access to a tag address of the cache memory.

There is an embodiment that the cache miss counter e10 is a cache miss counter e20 for counting the number of the cache misses in the cache access judged to be the access with respect to the particular address space in the particular address space judger e3 by each of the entry regions.

According to the foregoing constitution, it can be measured how much the number of the cache misses is generated in which of the entry regions in the particular address space. The program optimization can be thereby developed more accurately and more efficiently optimized in order to improve the performance.

Figure 3:
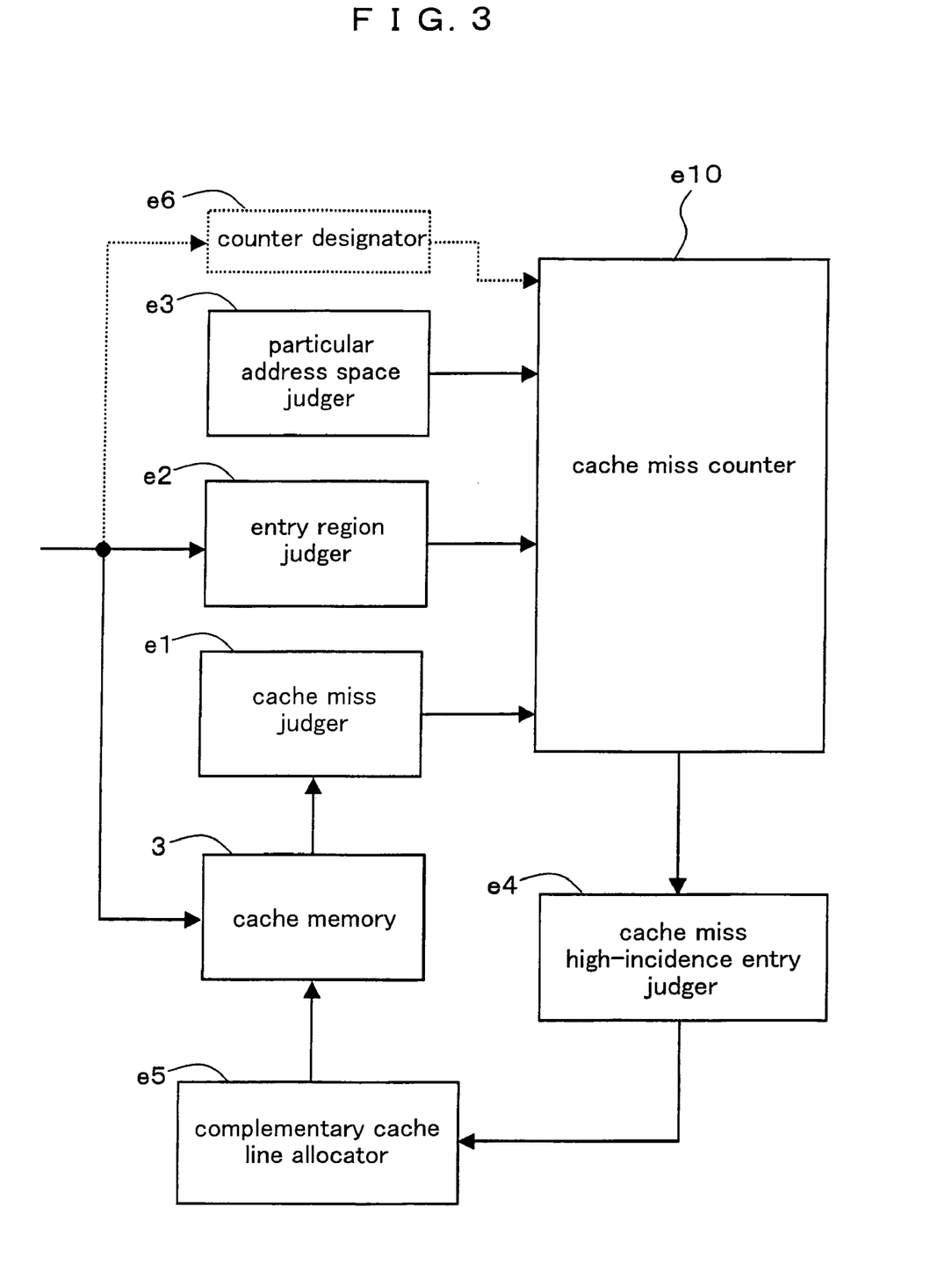
FIG. 3 is a (third) block diagram showing the constitution of the cache memory observation device according to the present invention.

As shown in FIG. 3, there is an embodiment that the cache memory observation device according to the present invention further comprises:

a cache miss repetition entry judger e4 for judging the entry region undergoing a repetition of the cache miss based on a counting result of the cache misses by the cache miss counter e10; and a complementary cache line allocator e5 for dynamically allocating a complementary cache line to the cache entry constituting the entry region judged to be undergoing the repetition of the cache miss by the cache miss repetition entry judger e4.

According to the foregoing constitution, the complementary cache line can be dynamically allocated to the cache entry where the cache miss is frequently generated, and an error rate in the relevant cache line can be reduced. As a result, the performance of the processor can be improved.

In the cache memory observation device according to the present invention, there is an embodiment that the cache miss counter e10 comprises:

a counter provided in each divided regions into one or a plurality of the entry region; and a counter designator e6 for designating an arbitrary counter using the index from the one or the plurality of counters provided in accordance with the divided region, wherein the cache miss counter e10 counts the number of the cache misses judged by the cache miss judger e1 separately by each of the counters designated by the counter designator e6.

Here, it is preferable that the counter designator designates the arbitrary counter from the plurality of counters using a few bits on a highest-order side in the index. Accordingly, it can be measured how many cache misses were generated in the one or the plurality of entry regions can be measured. As a result, the distribution of the cache misses in the entire cache memory can be known, and development of the program optimization can be thereby more efficiently advanced.

In addition, it is preferable that the counter designator designates the arbitrary counter from the plurality of counters by using a few bits on a lowest-order side in the index. Accordingly, it can be specifically judged how many cache misses were generated in each of the cache entries. As a result, detailed information per cache entry can be obtained, and development of the program optimization can be thereby more efficiently advanced.

A method of analyzing a processor according to the present invention is a method of analyzing a processor by observing a cache access executed to a cache memory comprising a plurality of cache entries, comprising the steps:

a first step for inputting an execution program to a processor analyzing device;

a second step for designating at least a part of an index included in an address for selecting an arbitrary cache line in the cache memory in order to count the cache miss in each of the cache entry regions;

a third step for judging which of a plurality of entry regions constituted in the cache memory by that one or a plurality of the cache entries is access corresponding to each of the cache accesses in the execution of the program by using at least a part of the index designated in the second step;

a fourth step for checking a distribution of the cache misses by judging the cache miss and counting number of the cache misses in each of the entry regions corresponding to each of the cache accesses in the execution of the program; and a fifth step for outputting the distribution of the cache misses.

Further, there is an embodiment that the method of analyzing the processor according to the present invention preferably further comprises the steps:

a sixth step for designating a particular address space that is an investigation object for the distribution of the cache misses; and a seventh step for judging whether or not the cache access is an access to the particular address space designated in the sixth step by comparing an address of the cache access to a tag address of the cache memory, wherein the number of the cache misses in the cache access judged in the seventh step to be the access to the particular address space designated in the sixth step is counted by each of the cache entry regions in the fourth step.

Besides, the cache memory constituted below is also useful. More specifically, a cache memory according to the present invention is a cache memory having a plurality of cache entries, comprises:

a cache miss judger for judging a cache miss when a cache access is made to the cache memory;

an entry region judger for judging which of a plurality of entry regions constituted in the cache memory by one or a plurality of cache entries constitute is access to each of the cache accesses using at least a part of an index included in an address for selecting an arbitrary cache line in the cache memory; and a cache miss counter for counting number of the cache misses judged by the cache miss judger in each of the entry regions which is made to correspond to each of the cache accesses by the entry region judger;

a cache miss repetition entry judger for judging the entry region undergoing a repetition of the cache miss based on a counting result of the cache misses by the cache miss counter; and a complementary cache line allocator for dynamically allocating a complementary cache line to the cache entry constituting the entry region judged to be undergoing the repetition of the cache miss by the cache miss repetition entry judger.

According to the cache memory thus constituted, the error rate in the cache line is automatically reduced, and the self allocation of the cache entry can be effectively realized.

As described above, according to the present invention, even in the case where the processor is operated too fast for the tracing rate to catch up with, the index distribution of the accesses to the cache memory can be obtained. Accordingly, the data effective for the optimization of the program can be efficiently obtained irrespective of addition of the circuit in a relatively small scale in the present invention.

Further, the complementary cache line is dynamically allocated to the cache entry frequently undergoing the cache miss based on the obtained index distribution of the accesses to the cache memory so that the number of the cache misses can be reduced. As a result, the higher performance of the processor can be effectively derived.

BRIEF DESCRIPTION OF THE DRAWINGS

These and other objects as well as advantages of the invention will become clear by the following description of preferred embodiments of the invention. A number of benefits not recited in this specification will come to the attention of those skilled in the art upon the implementation of the present invention.

DETAILED DESCRIPTION OF THE INVENTION

Hereinafter, preferred embodiments of a cache memory observation device for a processor according to the present invention are described in detail referring to the drawings.

Preferred Embodiment 1

Figure 4:
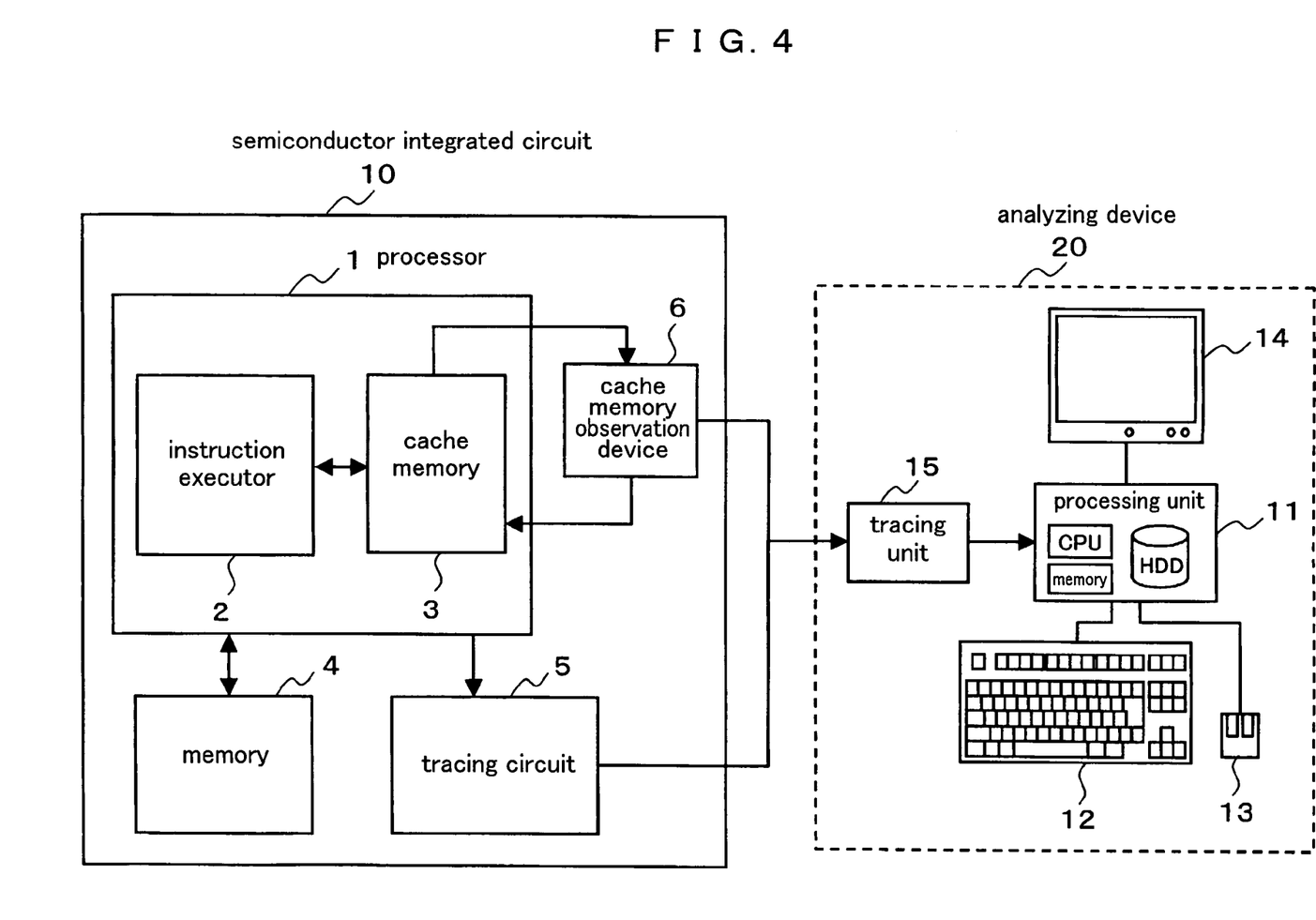
FIG. 4 is a block diagram showing constitutions of a semiconductor integrated circuit and an analyzing device according to a preferred embodiment 1 of to the present invention.

FIG. 4 is a block diagram showing constitutions of a semiconductor integrated circuit 10 and an analyzing device 20 according to a preferred embodiment 1 of to the present invention. In the semiconductor integrated circuit 10, a cache memory observation device 6 is additionally provided in the conventional example shown in FIG. 10. The tracing circuit 5 may be omitted. Except for the tracing circuit 5, the other components in the semiconductor integrated circuit is similar to that of the conventional example (FIG. 10) including a constitution of the analyzing device 20. Therefore, the same component is provided with the same reference numeral and is not described again. A cache memory to be measured by the cache memory observation device 6 comprises a plurality of cache entries (for example, 256). One or more than one of these cache entries constitute an entry region.

Figure 5:
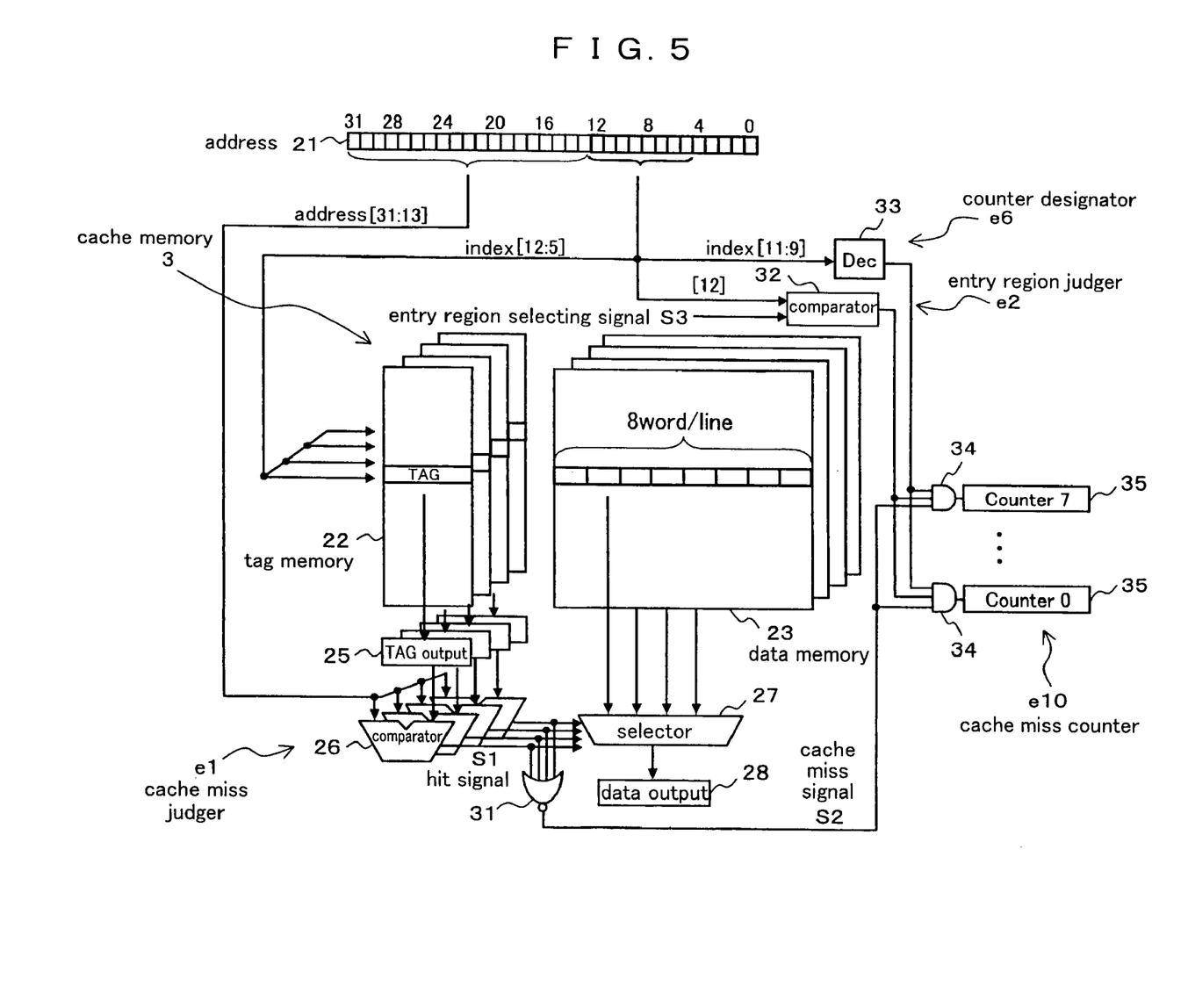
FIG. 5 is a block diagram showing a constitution of a cache memory observation device according the preferred embodiment 1.

FIG. 5 is a block diagram showing a constitution of the cache memory observation device 6 according the preferred embodiment 1. The cache memory observation device 6 is constituted according to the 4-way set associative method. In the cache memory observation device 6, a negative OR (NOR) gate 31, a comparator 32, a decoding circuit 33, AND gates 34, and Nos. 0-7 counters 35 are further provided in the constitution of the conventional example (FIG. 11). The NOR gate 31 corresponds to the cache miss judger e1 shown in FIG. 1, the comparator 32 corresponds to the entry region judger e2 shown in the drawing, the decoding circuit 33 corresponds to the counter designator e6, Nos. 0-7 of the AND gates 34 and counters 35 correspond to the cache miss counter e10.

In a manner similar to the conventional example, a pair of a tag memory 22 and a data memory 23 constitutes the cache memory 3. The tag memory 22 and the data memory 23 consists of RAM. Eight words constitute the cache line 24, and [4:2] of an address 21 is used for the selection of the cache line 24. [1:0] of the address 21 is used for the selection of bytes. A bit width of an index, which is a part of an address used for the selection of a particular cache line with respect to each address, is determined by number of cache entries. In the present example, the number of the cache entries is $2^8=256$, and the index is [12:5] of the address 21.

When a memory access is made from the processor 1 to an arbitrary address in the cache memory 3, the particular cache line is determined by the index corresponding to the arbitrary address, and data is read from the tag memory 22 and the data memory 23 corresponding to the determined cache line. Among the read data, the data of the tag memory 22 is compared to [31:13] of the address 21 which is high-order bits of the address in the comparator 26, and the read data in the relevant cache line is judged to be valid when the data is coincident with [31:13] of the address 21 in any of the four ways (cache hit). Then, a valid data 28 is selected from the data memory 23 by a selector 27 and outputted to be delivered to the processor 1. In the case where the read data is not coincident with [31:13] of the address 21 in any of the four ways (contents are different), the data in the relevant cache line is judged to be invalid (cache miss).

The negative OR gate 31 is connected to a line of a hit signal S1 outputted from the comparator 26 to the selector 27, and a cache miss signal S2 outputted from the negative OR gate 31 is inputted to the AND gates 34 provided in former stages of the Nos. 0-7 counters 35. Here, the comparator 26, negative OR gate 31 and the like correspond to the cache miss judger e1 shown in FIG. 1. Further, the cache entries in the cache memory 3 are equally divided into upper and lower groups. The lower-half group corresponds to 0-127 of the relevant cache entry, while the upper-half group corresponds to 128-255 thereof.

The comparator 32 executes determination of the entry region. The determination of the entry region is carried out by comparing a value of [12] of the index to an entry region selecting signal S3. An output of the comparator 32, that indicates if the access from the processor 1 with respect to the cache memory 3 is made to the entry region (lower half) located in the lower-half group (0-127) of the 256 cache entries or the entry region (upper half) located in the upper-half group (128-255) thereof, is inputted to the AND gates 34 provided in former stages of the Nos. 0-7 counters 35. This part corresponds to the entry region judger e2 shown in FIG. 1.

When the entry region (lower half) is accessed, [12] of the index is "0". And so, if "0" is previously set in the entry region selecting signal S3, the output of the comparator 32 is active. Then, any of the counters 35 is functioned via the AND gate 34, and only the accesses made to the entry regions (lower half) are counted. On the contrary, when the entry region (upper half) is accessed, [12] of the index is "1". Consequently, if "1" is previously set in the entry region selecting signal S3, the output of the comparator 32 is active. Then, any of the counters 35 is functioned via the AND gate 34, and only the accesses made to the entry regions (upper half) are counted.

Thus, the entry region selecting signal S3 is inputted to the comparator 32, and the output of the comparator 32 is inputted to the AND gate 34 so that the entry region desired to obtain the cache miss information can be selected.

A bus line of [11:9], which is a part of the index [12:5], is connected to the decoding circuit 33, and, which of the Nos. 0-7 counters 35 is designated can be decided depending on the cache access from the processor 1. The function of the decoding circuit 33 corresponds to the counter designator e6 shown in FIG. 1.

The o the Nos. 0-7 counters 35 and the AND gates 34 corresponding respectively to them correspond to each of divided regions obtained by equally dividing the cache memory 3. One or a plurality of entry regions constitutes the divided region. These AND gates 34 and the counters 35 correspond to the cache miss counter e10 shown in FIG. 1. Nos. 0-7 counters 35 are used for both of the accesses to the entry regions (lower half) located in the lower-half group of the 256 cache entries and the accesses to the entry regions (upper half) located in the upper-half group thereof.

Next, an operation of the cache memory observation device 6 according to the present preferred embodiment thus constituted is described. Here, description is given to the case where "0" is set in the entry region selecting signal S3.

1) When the cache access to an address "0x4000_0000", in the cache memory 3 is made from the processor 1, the index [12:5] is "0x00", and the data is accordingly read from the tag memory 22 and the data memory 23 in the lowest-order cache entry. Then, the data contents read from the tag memory 22 are compared to the high-order bits of the address 21 in the comparator 26 and thereby judged whether or not it is the access to the cache entry. When a result of the comparison by the comparator 26 is judged to be the cache hit by the negative OR gate 31, the negative OR gate 31 does not assert the cache miss signal S2. Therefore, the AND gate 34 is not conducted, and the counter 35 is not incremented.

On the contrary, when the comparison result is judged to be the cache miss by the negative OR gate 31, the negative OR gate 31 asserts the cache miss signal S2, and the relevant access is thereby judged to be the cache miss. At the time, [11:9], which is a part of the index, is inputted to the decoding circuit 33. The decoding circuit 33 accordingly judges to which of the Nos. 0-7 counters 35 the relevant cache access corresponds, in other words, designates one of the counters 35 corresponding to the relevant cache access. In this case, as [11:9], which is a part of the index, is "0x0", the No. 0 counter 35 is designated. Further In this case, as the index [12] is "0" and it is coincident based on a result of comparison with "0" previously set in the comparator 32, it is judged that the access was made to the entry region (lower half) located in the lower-half group of the 256 cache entries.

It is thus made known that the access to the address "0x4000_0000" is the "cache miss", "the access was made to the entry region (lower half)", and "the corresponding counter 35 is the No. 0 counter 35". Based on the facts, a cache miss count value of the No. 0 counter 35 is incremented.

Figure 6A:
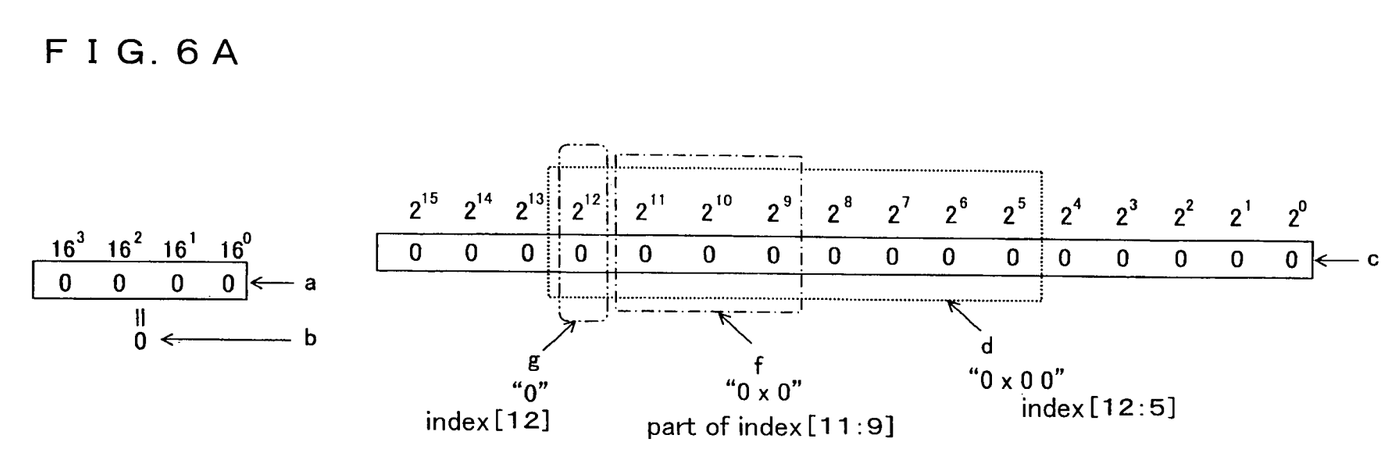
FIG. 6A is a (first) calculation diagram which helps understand an operation of the cache memory observation device according the preferred embodiment 1.

FIG. 6A is a calculation diagram which helps understand the foregoing operation. "0x0000" in the lower order in the address "0x4000_0000" corresponds to "a". This value is decimally "0" as shown in b. The development of the decimal "0" in binary 16 bits is shown in c. In c, all of the 16 bits show the value of "0". Observing the index [12:5] as shown in d, "00000000" in eight bits is shown, which is hexadecimally "0x00" and denotes the 0th cache entry (lowest order). Observing [11:9], which is a part of the index, "000" in three bits is shown. This value is hexadecimally "0x0" and denotes the No. 0 counter 35. Observing the index [12], "0" in one bit is shown, which corresponds to the entry region (lower half).

2) Besides, when the cache access to an address "0x5000_0020" is generated, the index [12:5] is "0x01", and the data is accordingly read from the tag memory 22 and the data memory 23 in the second-lowest order. Here, in the case of the cache hit, the cache miss signal S2 is not asserted, the AND gate 34 is not conducted, and the counter 35 is not incremented.

Adversely, in the case of the cache miss, the cache miss signal S2 is asserted. The index [12] is "0" at the time, and it is made known that the access was made to the entry region (lower half). Further, as [11:9], which is apart of the index, is "0x0", the No. 0 counter 35 is selected also in this case, and the count value thereof is incremented.

Figure 6B:
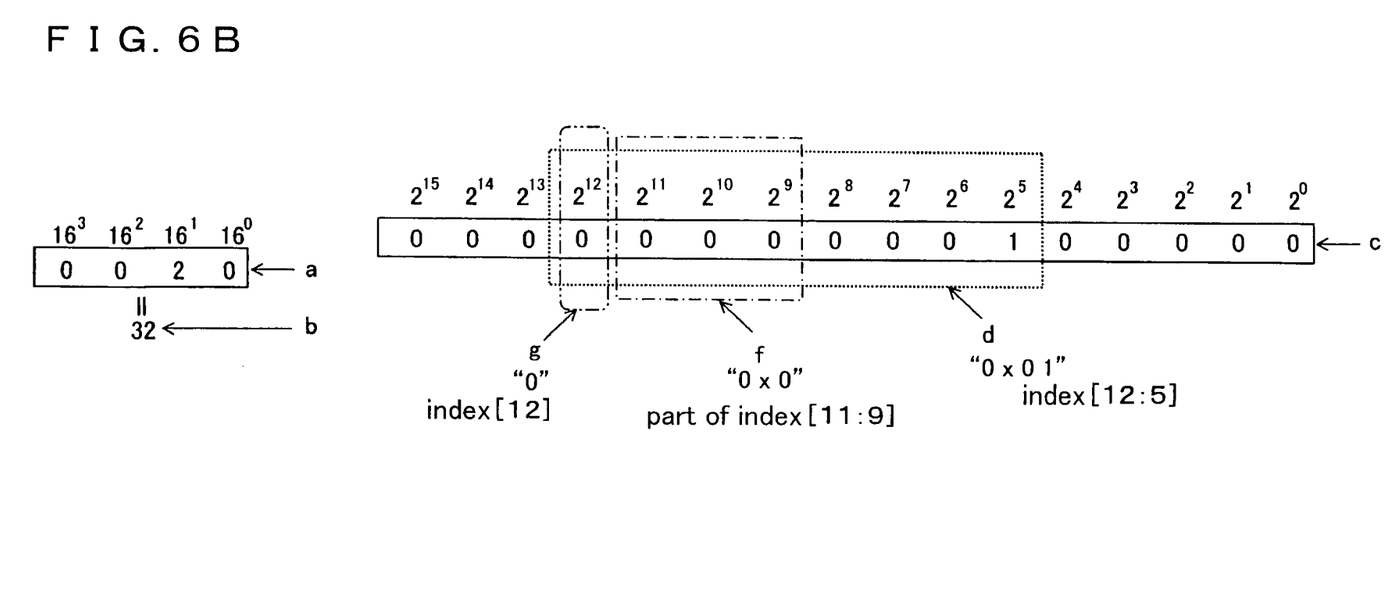
FIG. 6B is a (second) calculation diagram which helps understand the operation of the cache memory observation device according the preferred embodiment 1.

FIG. 6B is a calculation diagram which helps understand the foregoing operation. "0x0020 in the lower order of the address "0x5000_0020" corresponds to a. This value is decimally "32" as shown in b. The development of the decimal "32" in the binary 16 bits is made to be shown in c. In c, only the $2^5$ order shows "1", while all other 15 bits show "0". Observing the index [12:5] as shown in d, it becomes "00000001" in eight bits, which is hexadecimally "0x01" and denotes the first cache entry. Observing [11:9], which is a part of the index, "000" in three bits is shown. This value is hexadecimally "0x0" and denotes the No. 0 counter 35. Observing the index [12], it becomes "0" in one bit, which corresponds to the entry region (lower half).

3) Furthermore, when the cache access to an address "0x5000_FFE0" is generated, the index [12:5] is "0xFF" in this case, and the data is accordingly read from the tag memory 22 and the data memory 23 in the highest-order cache entry. Here, in the case of the cache hit, the cache miss signal S2 is not asserted, the AND gate 34 is not conducted, and the counter 35 is not incremented.

On the contrary, in the case of the cache miss, the cache miss signal S2 is asserted. As the index, [12] is "0" at the time, and it is known that the access was made to the entry region (upper half), and the relevant access is not an object for counting.

Figure 7A:
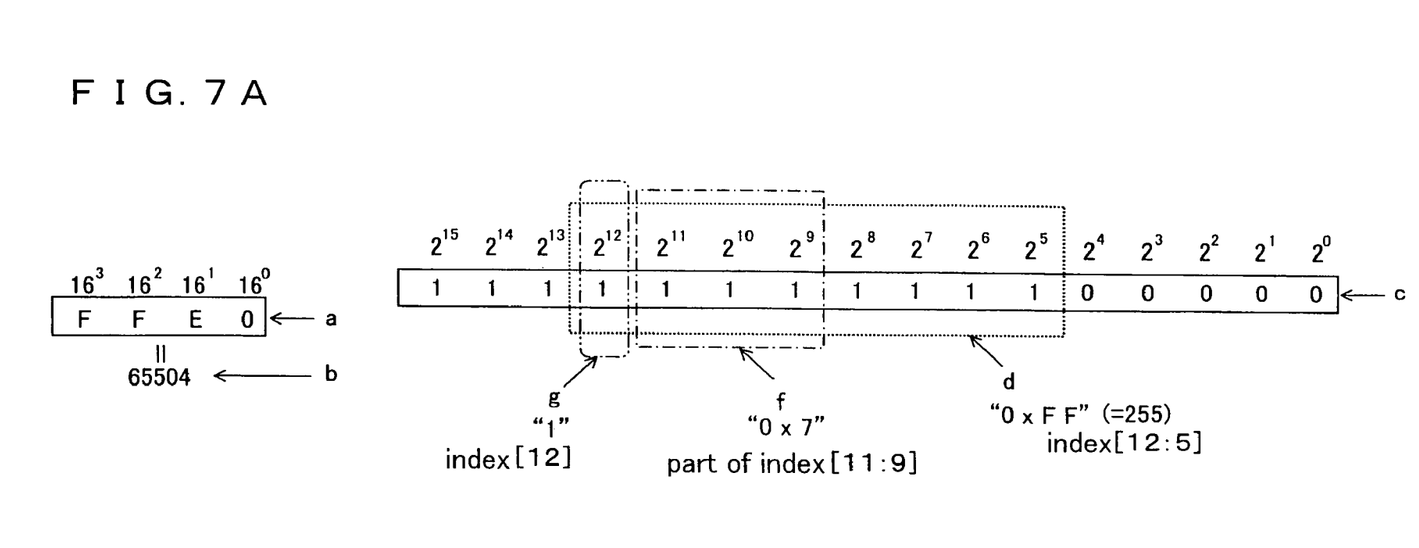
FIG. 7A is a (third) calculation diagram which helps understand the operation of the cache memory observation device according the preferred embodiment 1.

FIG. 7A is a calculation diagram which helps understand the foregoing operation. "0xFFE0" in the lower order of In the address "0x5000_FFE0" corresponds to a. This value is decimally "65504" as shown in b. When the decimal "65504" is developed into binary 16 bits, it becomes to be shown in c. In c, all of the $2^0$-$2^4$ bits show the value of "0", while all of the $2^5$-$2^{15}$ bits show the value of "1". Observing the index [12:5] as shown in d, it becomes "11111111" in eight bits, which is hexadecimally "0xFF" and denotes the 255th cache entry (16×15+1×15=255). Observing [11:9], which is a part of the index, it becomes "111" in three bits. This value is hexadecimally "0x7" and denotes No. 7 counter 35. Observing the index [12], it becomes "1" in one bit, which denotes to the entry regions (upper half). Because "0" is set in the entry region selecting signal S3 in the present operation example, the relevant access is not an object for counting.

4) Moreover, when the cache access to an address "0x5000_0FE0" is generated, the index [12:5] is "0x7F", and the data is accordingly read from the tag memory 22 and the data memory 23 in the 127th cache entry. Here, in the case of the cache hit, the cache miss signal S2 is not asserted, the AND gate 34 is not conducted, and the counter 35 is not incremented.

Adversely, in the case of the cache miss, the cache miss signal S2 is asserted. As the index, [12] is "0" at the time, and it is known that the access was made to the entry region (lower half). As [11:9], which is a part of the index, is "0x7", the No. 7 counter 35 is selected, and the cache miss count value of the No. 7 counter 35 is incremented.

Figure 7B:
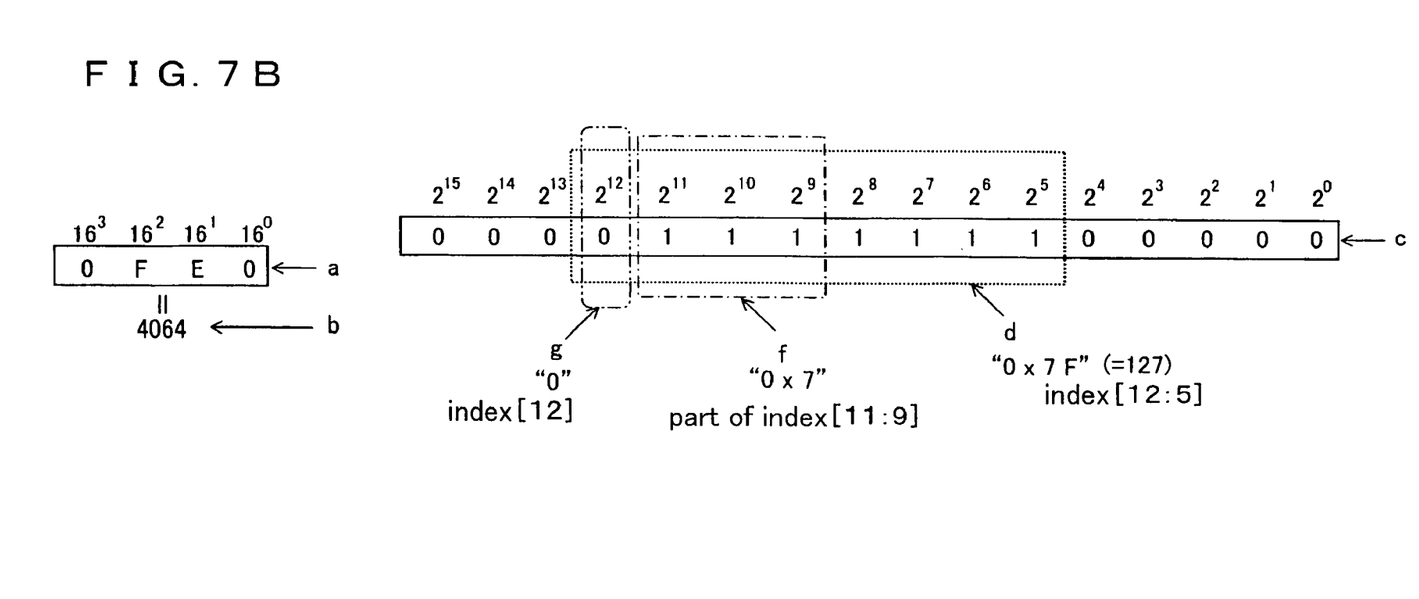
FIG. 7B is a (fourth) calculation diagram which helps understand the operation of the cache memory observation device according the preferred embodiment 1.

FIG. 7B is a calculation diagram which helps understand the foregoing operation. "0x0FE0" in the lower order of the address "0x5000_0FE0" corresponds to a. This value is decimally "4064" as shown in b. When the decimal "4064" is developed into binary 16 bits, it becomes to be shown in c. In c, all of the $2^0$-$2^4$ bits show the value of "0", all of the $2^5$-$2^{11}$ bits show the value of "1", and all of the $2^{12}$-$2^{15}$ bits show the value of "0". Observing the index [12:5] as shown in d, it becomes "11111111" in eight bits, which is hexadecimally "0x7F" and denotes the 127th cache entry (16×7+1×15=127). Observing [11:9], which is apart of the index, it becomes "111" in three bits. This value is hexadecimally "0x7" and denotes the No. 7 counter 35. Observing the index [12], it becomes "0" in one bit, which corresponds to the entry regions (lower half). When "1" is set in the entry region selecting signal S3, a similar counting operation can be realized in the entry regions (upper half) located in the upper-half group of the 256 cache entries.

As described above, when "0" is set in the entry region selecting signal S3, the entry regions (lower half) including the 128 cache entries, which are the lower-half group of the 256 cache entries, are selected, and the divided regions (comprising the 16 cache entries) resulting from the division of the entry regions (lower half) into eight regions with [11:9] which is a part of the index, are allocated to the Nos. 0-7 counters 35. Thereby, the number of the cache misses can be measured every eight divided regions.

Based on the foregoing result, an address map of the program is changed so that the accesses to the entry region and the divided region where the cache miss is often generated can be reduced. As a result, the cache hit ratio in the program can be improved.

Preferred Embodiment 2

Figure 8:
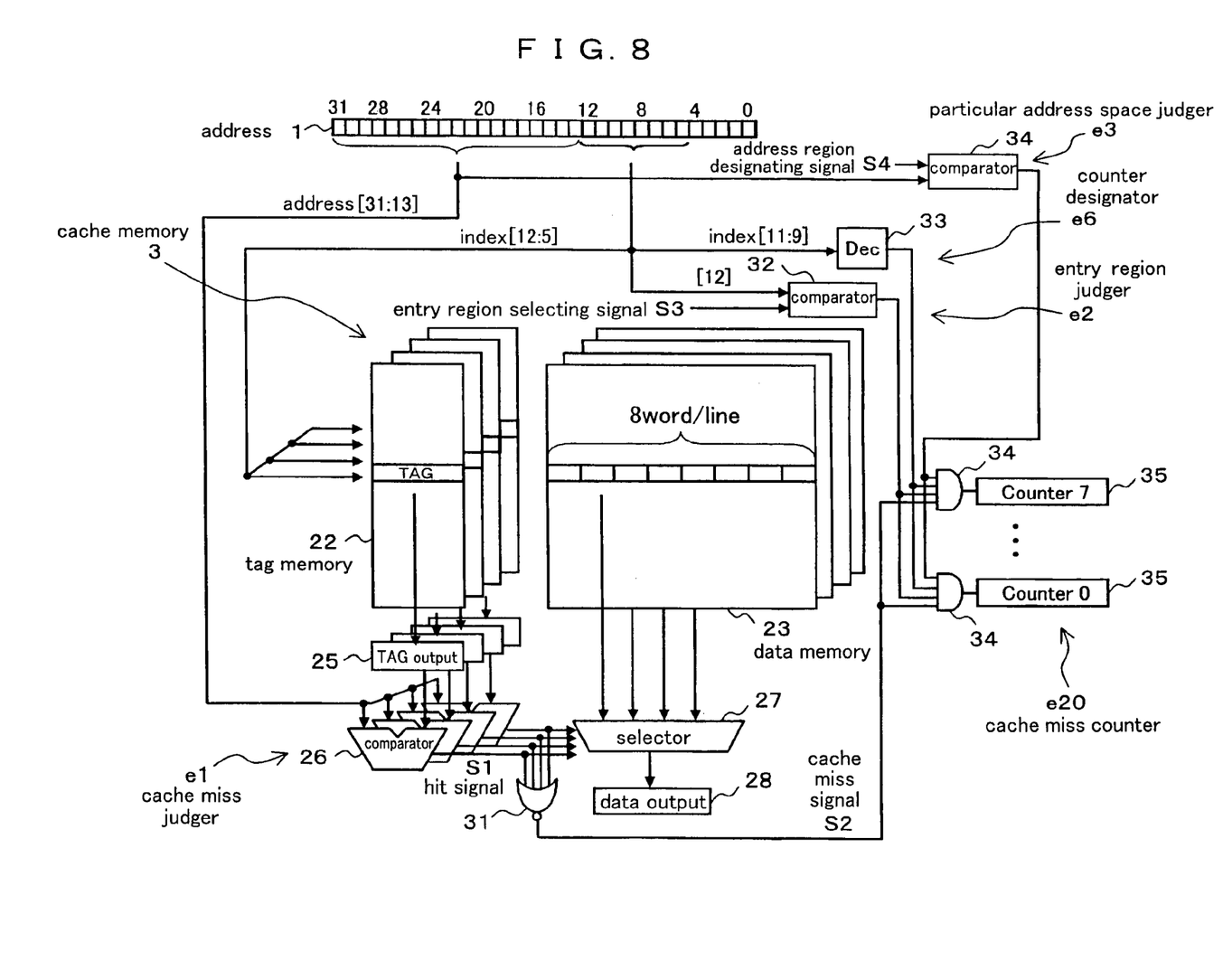
FIG. 8 is a block diagram showing a constitution of a cache memory observation device according to a preferred embodiment 2 of the present invention.

FIG. 8 is a block diagram showing a constitution of a cache memory observation device 6 according to a preferred embodiment 2 of the present invention. In FIG. 8, the same reference symbols as those shown in FIG. 5 according to the preferred embodiment 1 show the same components. In the present preferred embodiment, a comparator 36 is further provided as a new component. The comparator 36 compares the value of [31:13] of the address 21 to an address region designating signal S4 to thereby designate a particular address space for which it is desired to obtain the cache access information. For example, when "0x5000_XXXX" is designated to the address region designating signal S4, only the accesses in the regions "0x5000_0000"-"0x5000_FFFF" are to be measured. The comparator 36 corresponds to the particular address space judger e3 shown in FIG. 2. An output of the comparator 36 is inputted to the AND gates 34. Here, the AND gate 34 is a 4-input AND gate. The AND gates 34 and Nos. 0-7 counters 35 correspond to the cache miss counter e20. Any other component is similar to those shown in FIG. 5 according to the preferred embodiment 1. The same components are provided with the same reference symbols and not described again.

Next, an operation of the cache memory observation device 6 according to the present preferred embodiment thus constituted is described. Here, a description is given to the case that "0x5000_XXXX" is designated to the address region designating signal S4, and "0" is set to the entry region selecting signal S3. The entry region selecting signal S3 ("0") designates the entry regions (lower half).

1) When the cache access to the address, "0x4000_0000" is made from the processor 1, the index [12:5] is "0x00", and the data is accordingly read from the tag memory 22 and the data memory 23 in the cache entry in the lowest order (entry 0). In the case of the cache hit, the cache miss signal S2 is not asserted, the AND gate 34 is not conducted, and the counter 35 is not incremented.

In the case of the cache miss, on the contrary, the cache miss signal S2 is asserted. At the time, [11:9], which is a part of the index, is inputted to the decoding circuit 33 in a manner similar to the preferred embodiment 1, and the No. 0 counter 35 is selected because [11:9], which is a part of the index, is "0x0". Further, the relevant cache access is valid since the index [12] is "0", and the comparison is executed in the comparator 26. As a result of the comparison treatment in the comparator 26, it is known that the relevant access was made to the entry region (lower half). Further, it is known that the access to the address "0x4000_0000" is out of measurement target because "0x5000_XXXX" is designated to the address region designating signal S4. The AND gate 34 is not conducted, and the cache miss count value in the counter 35 is not incremented.

2) Furthermore, when the cache access to the address, "0x5000_0020", is generated, the index [12:5] is "0x01" in this case, and the data is accordingly read from the tag memory 22 and the data memory 23 in the cache entry in the second lowest-order. In the case of the cache hit, as the cache miss signal S2 is not asserted, the AND gate 34 is not conducted, and the counter 35 is not incremented.

In the case of the cache miss, on the contrary, the cache miss signal S2 is asserted. At the time, as the index [12] is "0", it is known that the relevant access was made to the entry region (lower half). Further, the No. 0 counter 35 is selected because [11:9], which is a part of the index, is "0x0". As "0x5000_0000" is designated to the address region designating signal S4, it is known that the cache access to the address "0x5000_0020" is a measurement target. Therefore, the cache miss count value in the No. 0 counter 35 is incremented.

3) Besides, when the cache access to the address, "0x5000_FFE0", is generated, the index [12:5] is "0xFF" in this case, and the data is accordingly read from the tag memory 22 and the data memory 23 in the highest-order cache entry. In the case of the cache hit, the cache miss signal S2 is not asserted, the AND gate 34 is not conducted, and the counter 35 is not incremented.

In the case of the cache miss, on the contrary, the cache miss signal S2 is asserted. At the time, as the index [12] is "1", it is known that the relevant access was made to the entry region (upper half) and is out of a counting target.

4) When the cache access to the address, "0x5000_0FE0", is generated, the index [12:5] is "0x7F" in this case, and the data is accordingly read from the tag memory 22 and the data memory 23 in the 127th cache entry. Here, in the case of the cache hit, the cache miss signal S2 is not asserted, the AND gate 34 is not conducted, and the counter 35 is not incremented.

4) In the case of the cache miss, on the contrary, the cache miss signal S2 is asserted. At the time, as the index [12] is "0", and it is known that the relevant access was made to the entry region (lower half). Further, as [11:9], which is apart of the index, is "0x7", the No. 7 counter 35 is selected in this case. It is known that the cache access to the address "0x5000_0FE0" is a measurement target because "0x5000_XXXX" is designated to the address region designating signal S4. Then, the cache miss count value of the No. 7 counter 35 is incremented.

As described above, according to the present preferred embodiment, "0x5000_XXXX" is designated for the address region designating signal S4, and "0" is set to the entry region selecting signal S3 so that the entry regions (lower half) comprising the 128 pieces of the cache entries located in the lower-half group of the 256 cache entries are selected. Accordingly, the eight divided regions in total (each comprising 16 cache entries) resulting from the division of the entry regions (lower half) by [11:9], which is a part of the index, are allocated to the Nos. 0-7 counters 35. As a result, the number of the cache misses in each of the eight divided regions can be measured in the cache accesses to the address region "0x5000_0000"-"-0x5000_FFFF".

Therefore, the distribution of the number of the cache misses in the program allocated to the particular address space (in this example, address region, "0x5000_0000"-"-0x5000_FFFF") can be checked. As a result, improvement of the program can be implemented more accurately and efficiently.

In the case where "1" is set to the entry region selecting signal S3, a similar measurement can be realized with respect to the entry regions (upper half) located in the upper-half group of the 256 cache entries.

Preferred Embodiment 3

Figure 9:
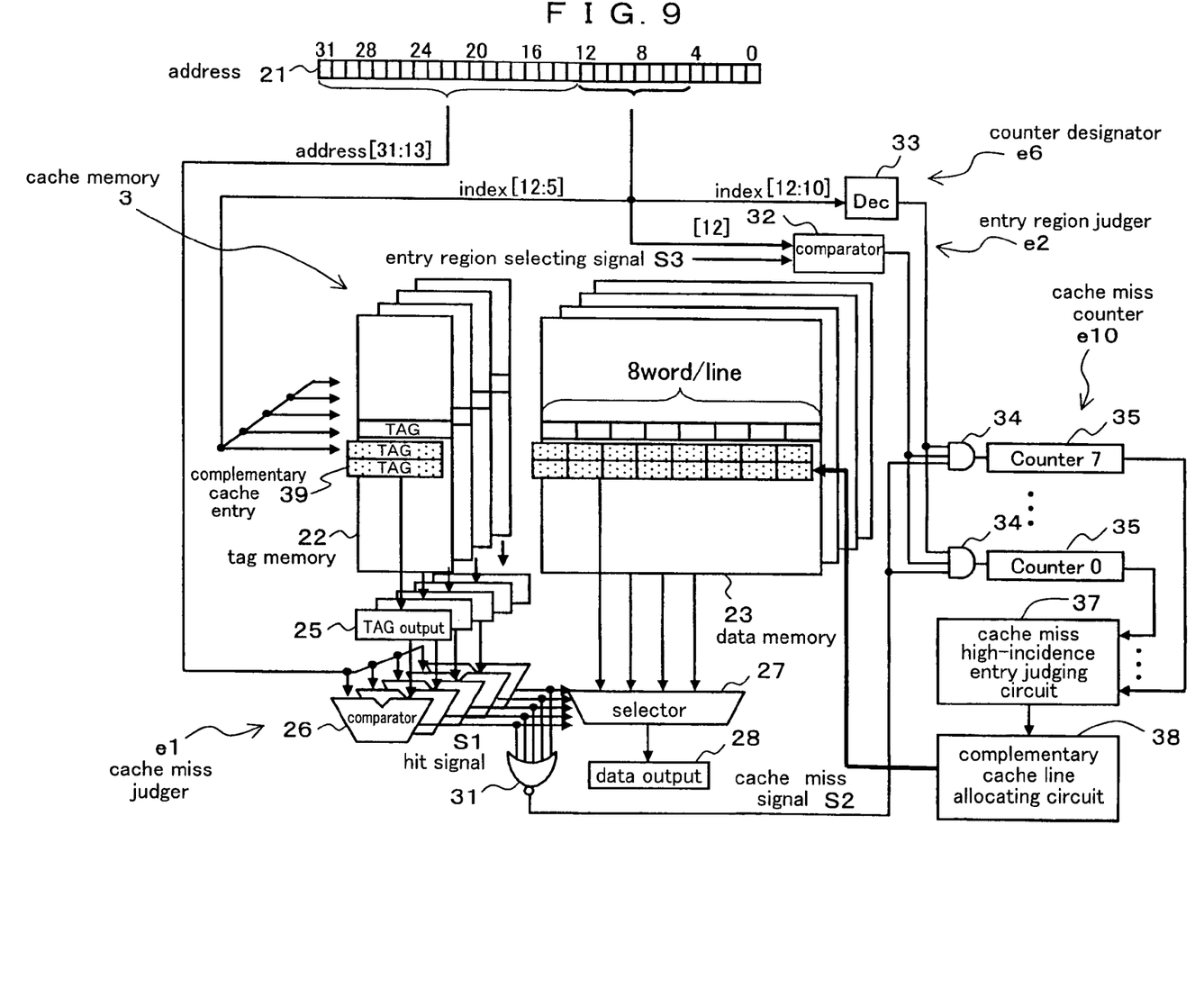
FIG. 9 is a block diagram showing a constitution of a cache memory observation device according to a preferred embodiment 3 of the present invention.

FIG. 9 is a block diagram showing a constitution of a cache memory observation device 6 according to a preferred embodiment 4 of the present invention. In FIG. 9, the same reference symbols as those shown in FIG. 5 according to the preferred embodiment 1 show the same components. In the present preferred embodiment, a cache miss repetition entry judging circuit 37 and a complementary cache line allocating circuit 38 are further provided as new components. The outputs of the Nos. 0-7 counters 35 are supplied to the cache miss repetition entry judging circuit 37. The cache miss repetition entry judging circuit 37 measures the cache miss count values of the respective counters 35 to thereby judge in which of the divided regions the cache miss is frequently generated. The complementary cache line allocating circuit 38 dynamically allocates a complementary cache entry 39 to the cache entry constituting the divided region where the cache miss is frequently generated based on a result of the judgment by the cache miss repetition entry judging circuit 37. The cache miss repetition entry judging circuit 37 corresponds to the cache miss repetition entry judger e4 in FIG. 3, and the complementary cache line allocating circuit 38 corresponds to the complementary cache line allocator e5 shown in the drawing. Any other component is similar to those shown in FIG. 5 according to the preferred embodiment 1. The same components are provided with the same reference symbols and not described again.

Next, an operation of the cache memory observation device 6 according to the present preferred embodiment thus constituted is described. Here, a description is given with respect to the case where [12:10] of the index is connected to the decoding circuit 33.

When the cache access is made to various addresses from the processor 1 and the cache miss is generated, the cache miss count values of the respective counters 35 are incremented as described in the preferred embodiment 1. The values are inputted to the cache miss repetition entry judging circuit 37, and it is judged here in which of the divided regions the cache miss is frequently generated. Assuming that the cache miss count value of the No. 3 counter 35 shows a largest number, it is known that the number of the cache misses is generated most frequently in the divided region corresponding to the No. 3 counter 35. Then, the complementary cache line allocating circuit 38 allocates the complementary cache entry 39 to the cache entry constituting the divided region corresponding to the No. 3 counter 35. Because the complementary cache entry 39 is allocated to the cache entry constituting the divided region corresponding to the No. 3 counter 35, a cache constitution in the cache memory 3 becomes the 5-way constitution. As a result, storage place for the data having the same index, increases from four locations, to five locations in the foregoing constitution, which improves the cache hit ratio.

Thus, the complementary cache line allocating circuit 38 dynamically allocates the complementary cache entry 39 to the arbitrary cache entry based on the judgment result by the cache miss repetition entry judging circuit 37 so that the error rate in the relevant cache line can be reduced, and the performance of the processor can be thereby improved.

Further, by embedding the constitution according to the preferred embodiment 3 into the cache memory, the cache memory, that executes self-allocating the cache entry so as to reduce the error rate in the cache line automatically, can be realized.

Further, in any of the preferred embodiments, the bit width of the index inputted to the decoding circuit 33 is determined by how many a group of the cache entries are divided in order to obtain the cache miss information. In the present example, three bits ($2^3=8$) is used because the cache entries are divided into the eight divided regions. However, if the index is half-divided, only one bit is necessary. If the cache entries are divided into four divided regions, two bits are necessary. In other words, in the case where the cache entries are divided into $2^n$ regions, the bit width of the index inputted to the decoding circuit 33 is n bits. Further, only one bit is used in the entry region selecting signal S3 in this example, however, a plurality of bits can be used.

While the preferred embodiments of this invention has been described in detail, it will be understood that various modifications may be made therein, and it is intended to cover in the appended claims all such modifications as fall within the true spirit and scope of this invention.

What is claimed is:

1. A cache memory observation device for observing a cache access executed to a cache memory comprising a plurality of cache entries comprising:
   a cache miss judger for judging a cache miss when the cache access is executed;
   an entry region judger for judging which of a plurality of entry regions constituted with one or a plurality of cache entries in the cache memory is accessed by each of a plurality of cache accesses using at least a part of an index for selecting an arbitrary cache line in the cache memory; and
   a cache miss counter for counting number of cache misses judged by the cache miss judger in each entry region which is made to correspond to each cache access by the entry region judger,
   wherein the cache miss counter comprises:
      a counter provided with respect to each of divided regions obtained by dividing one of said plurality of entry regions into one or a plurality of pieces; and
      a counter designator for designating an arbitrary counter using an index from the one or the plurality of counters in accordance with the divided regions, wherein:
      the cache miss counter counts the number of the cache misses judged by the cache miss judger by each counter designated by the counter designator.

2. The cache memory observation device according to claim 1, wherein the counter designator designates an arbitrary counter from the one or the plurality of counters using a few bits on a highest-order side of the index from the one or the plurality of counters.

3. The cache memory observation device according to claim 1, wherein the counter designator designates an arbitrary counter from the one or the plurality of counters using a few bits on a lowest-order side of the index from the one or the plurality of counters.

* * * * *